United States Patent
Strobel

(10) Patent No.: US 6,425,541 B1
(45) Date of Patent: *Jul. 30, 2002

(54) BELT RETRACTOR AND METHOD OF CONTROLLING OPERATION OF AN OCCUPANT RESTRAINT SYSTEM

(75) Inventor: Ralf Strobel, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/571,470

(22) Filed: May 16, 2000

(30) Foreign Application Priority Data

May 18, 1999 (DE) .......................................... 199 22 720

(51) Int. Cl.⁷ .............................................. B65H 75/48
(52) U.S. Cl. ..................... 242/371; 242/383; 242/382.4; 200/61.58 SB
(58) Field of Search ................................ 242/371, 383, 242/382.4; 200/61.58 SB

(56) References Cited

U.S. PATENT DOCUMENTS 5,553,804 A * 9/1996 Hamann .................. 242/382.4
5,558,370 A * 9/1996 Behr .......................... 280/806

* cited by examiner

*Primary Examiner*—Donald P. Walsh
*Assistant Examiner*—Jonathan R. Miller
(74) *Attorney, Agent, or Firm*—Tarolli, Sundheim, Covell, Tummino & Szabo L.L.P.

(57) ABSTRACT

In a belt retractor the absolute angle of rotation of the belt reel is sensed by an incremental counter. The incremental counter is calibrated by sensing the angle of rotation of a control disc coupled to the belt reel by a reduction gear unit. The count of the incremental counter represents the absolute angle of rotation of the belt reel with high accuracy. Various components of a restraint system are controlled as a function of the thus measured absolute angle of rotation of the belt reel.

13 Claims, 3 Drawing Sheets

BELT RETRACTOR AND METHOD OF CONTROLLING OPERATION OF AN OCCUPANT RESTRAINT SYSTEM

The invention relates to a belt retractor comprising a frame, a belt reel rotatably mounted about an axis in the frame, a control disc coaxial with the belt reel and a reduction gear unit which translates the angle of rotation of the belt reel into a reduced angle of rotation of the control disc. The invention relates furthermore to a method of controlling operation of an occupant restraint system.

BACKGROUND OF THE INVENTION

In a belt retractor the total range of angular rotation of the belt reel is determined by the belt webbing in its fully coiled and fully uncoiled conditions. Within this range of angular rotation various relationships exist between the absolute angle of rotation of the belt reel and characteristic conditions of the belt system. Thus, zero angle of rotation (belt webbing fully coiled) is an indication that the belt is not in use. At maximum angle of rotation (belt webbing fully uncoiled) a switching action may be introduced to translate the belt retractor into an automatically blocked condition which is suitable for example for restraining loads or child seats. Between these extreme positions various characteristic conditions may be defined which, where necessary, in conjunction with other parameters, more particularly seating posture, seat occupancy and the like, may be assigned to particular switching conditions where activation of various security functions is expedient, it being especially desirable for the system to "see" the conditions in which activation of an air bag is to be inhibited, examples of which are the use of child seats, incorrect seated posture (e.g. leaning forward) and belt buckled with seat empty. Recognizing such conditions is only possible with adequate reliability when the angle of rotation of the belt reel can be sensed with high accuracy. It is known (e.g. DE 298 20 086.4) to translate the total range of angular rotation of the belt reel by means of a reduction gear unit to a single revolution of an indexing disc. Since, however, the range of rotation of the belt comprises a number of revolutions, each angle on the indexing disc corresponds to an accordingly greater angular range of the belt reel rotation so that the indexing positions cannot be sensed with the desired accuracy.

BRIEF SUMMARY OF THE INVENTION

The invention provides a belt retractor of the aforementioned kind in which the absolute angle of rotation of the belt reel may be determined with high accuracy by uncomplicated technical means.

In accordance with the invention, the retractor comprises an incremental counter which is coupled to the belt reel. The incremental counter, on rotation of the belt reel, is incremented or decremented depending on the sense of rotation of the belt reel. The counter is calibrated by a sensor associated to the control disc so that the count of the incremental counter is representative of the absolute angle of rotation of the belt reel. By the count of the incremental counter the absolute angle of rotation of the belt reel is always represented with high accuracy. The accuracy of this representation depends solely on the resolution of the incremental counter. The incremental counter is formed preferably by an incremental scale non-rotatably coupled to the belt reel and a sensor fixed to the frame opposite the incremental scale. The pitch of the incremental scale then determines the resolution of the incremental counter. A suitable incremental detector may be achieved with optical or magnetic elements known in the art.

The control disc with the associated sensor has substantially the task of calibrating the incremental counter. In the simplest case the incremental counter is reset to zero when the belt webbing is totally coiled. By providing arcuate recesses on the periphery of the control disc, particular ranges of rotation of the belt reel may be detected which correspond to specific conditions of the belt retractor, for example a range of rotation of the belt reel that corresponds to the belt being buckled up.

The invention also provides a method of controlling operation of an occupant restraint system comprising a belt system including a belt retractor in accordance with the invention and at least one of the following components:

an inflatable protective cushion a belt tensioner a belt force limiter.

In the method in accordance with the invention, operation of these components of the restraint system is controlled as a function of the count of the incremental counter. The restraint function may be optimized by this method particularly effectively when the individual components are designed for operation in a plurality of stages. When, for instance, a seating posture is sensed which is out of position (OOP), then the air bag should only be inflated to a restricted degree or, indeed, not at all. Activating the air bag is to be totally inhibited when the count of the incremental counter indicates, where necessary in conjunction with other parameters, that the belt is being used to safeguard a child seat.

In one particularly advantageous aspect of the method, the second derivative of the count with respect to time furnishes an indication as to the rotary acceleration of the belt reel in the withdrawal direction. When a particularly high rotary acceleration is sensed, this is taken as an indication of a severe impact, i.e. the components of the restraint system then being activated to the highest stage.

BRIEF DESCRIPTION OF THE DRAWINGS

Further features and advantages of the invention read from the following description and are evident from the drawings to which reference is made in the description, in which.

DETAILED DESCRIPTION OF THE PREFERRED EMBODIMENT

Figure 1:
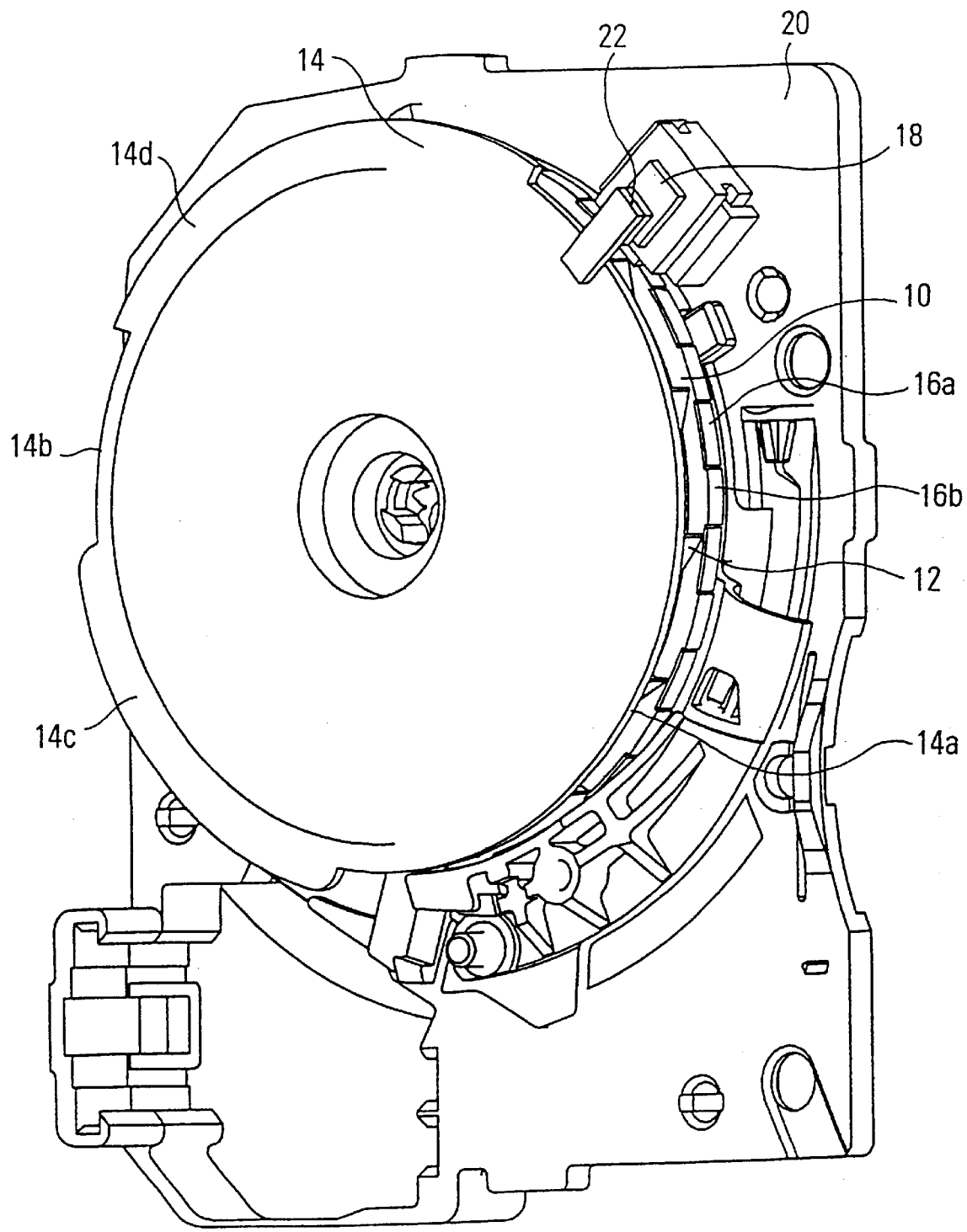
FIG. 1 is a schematic perspective view on the control side of a belt retractor.

The belt retractor in accordance with the invention may be of any conventional configuration and is thus not detailed in the following. It includes, rotatably mounted in a frame, a belt reel on which the belt webbing is coiled. A locking mechanism is provided to selectively lock the belt reel to the frame. The locking mechanism is triggered by a vehicle and webbing sensitive input control mechanism arranged on one side of the belt retractor which, as shown in FIG. 1, is the so-called control side of the belt retractor.

A coupling disc 10 is connected to the belt reel for joint-rotation. The coupling disc has a control toothing including teeth 12 on its outer periphery. A control disc 14 is arranged coaxial to the coupling disc 10 to which it is coupled via a reduction gear unit. The reduction gear unit has a ratio such that the full range of rotation of the belt reel between the fully coiled and fully uncoiled belt webbing conditions is translated into a single complete revolution of the control disc 14.

The coupling disc 10 is provided on its outer periphery with alternating zones 16a, 16b of an incremental scale. In an optical configuration of this incremental scale the zones 16a, 16b are alternatingly reflective and opaque. An incremental sensor 18 is arranged on the frame 20 opposite to the zones 16a, 16b of the incremental scale. This incremental sensor 18 generates for each zone 16a, 16b a pulse, respectively a pulse gap. At the same time the incremental sensor 18 generates a sign signal indicative of the sense of rotation of the coupling disc 10 connected to the belt reel. Detecting the sense of rotation is done by known ways and means with a pair of sensor elements, the detection ranges of which overlap in each zone sensed. Every time a zone is passed each of the sensor elements generates a pulse; the sense of rotation being concluded from the sequence in which the sensor elements output the pulses.

The control disc 14 is provided in its circumferential direction with two arcuate recesses 14a, 14b. A further sensor 22 arranged fixed to the frame is associated with the control disc 14; the signal output by this sensor 22 indicates whether a recess 14a, 14b or one of the lands 14c, 14d located in between is opposite the sensor.

Figure 2:
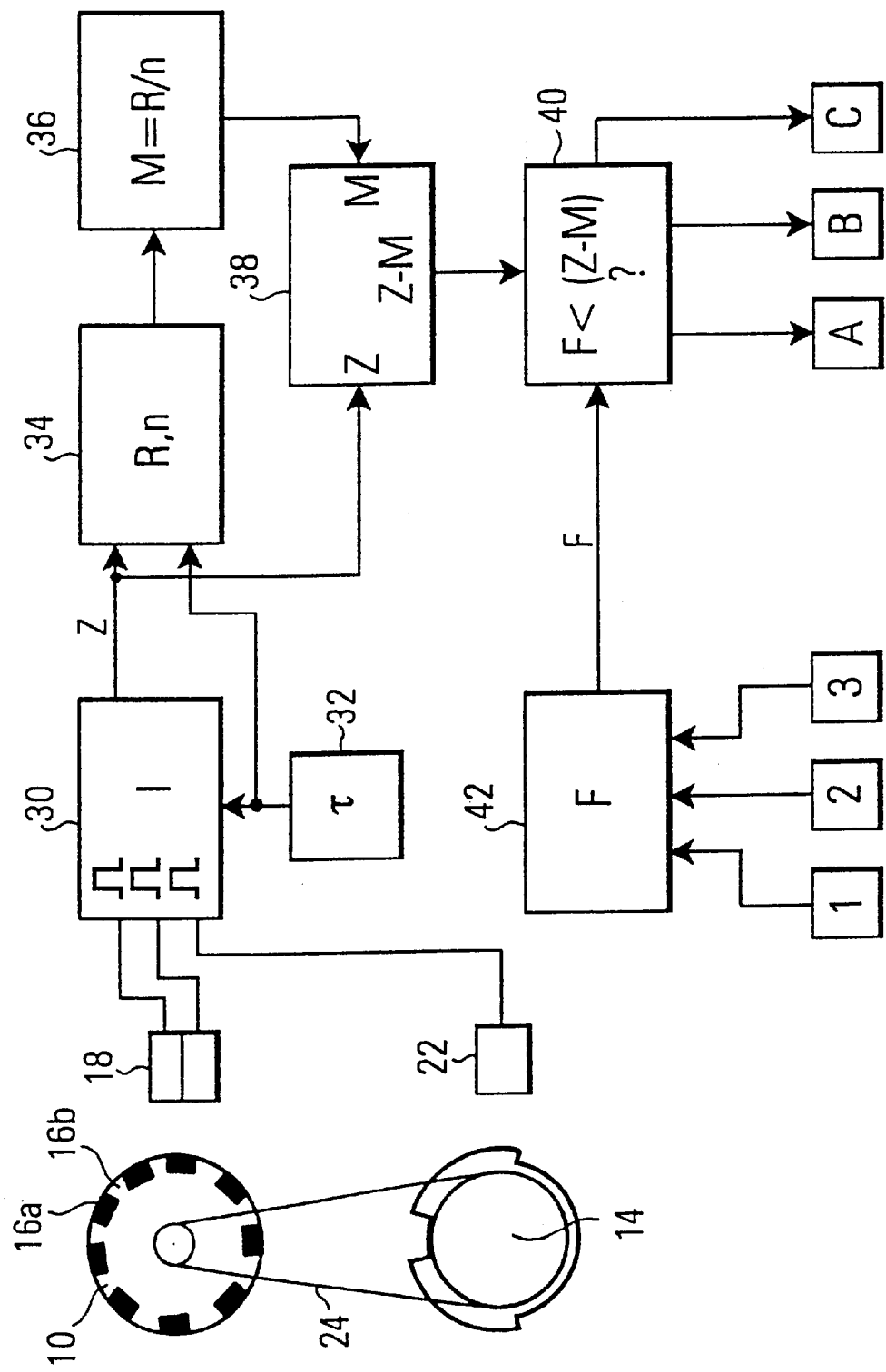
FIG. 2 is a block diagram of a control circuit associated with the belt retractor.

Referring now to FIG. 2 there is illustrated the coupling disc 10 and the control disc 14 symbolically coupled by an endless belt 24, the belt 24 forming with two pulleys of differing diameters a reduction gear unit via which the control disc 14 is driven by the coupling disc 10. Pulse signals output by a pair of sensor elements of an incremental detector 18 are applied to an incremental counter 30 which also receives the signal of the sensor 22. A timer 32 outputs periodic strobe signals to the incremental counter 30. These strobe signals are also applied to a memory 34 which also receives from the incremental counter 30 the current count Z every time a strobe signal occurs. In the memory 34 two variables are memorized: a first variable R, computed on each strobe pulse as the sum of the previous value R and of the current count Z, and a second variable n which is incremented by one on every strobe pulse. These variables R and n are processed in a divider 36 into a mean value M computed as the quotient of R and n. This mean value M is applied together with the current count Z to a subtractor 38 which forms the difference of Z and M. This difference of Z and M is then compared in a comparator 40 to a preset value F. The preset value F is furnished by a presetting unit 42. The presetting unit 42 forms the preset value F from parameters which are characteristic of conditions of a vehicle occupant restraint system. Three signal transducers 1, 2 and 3 are shown merely by way of an example in FIG. 2. The signal transducer 1 may be associated for instance with a belt buckle switch to determine whether the seat belt is buckled up. The signal transducer 2 may furnish a signal as a function of the weight of the occupant. The signal transducer 3 may be arranged, for example, on the seat rail to provide information on the longitudinal seat position.

The comparator 40 is symbolically coupled to three components A, B and C of the restraint system, these components of the restraint system being, for example, an inflatable protective cushion (air bag), a belt retractor and a belt force limiter on the belt retractor. Each of these components A, B, C may be designed for operation in plural stages. The output signal of the comparator 40 determines the required operating stage of each component of the restraint system.

Figure 3:
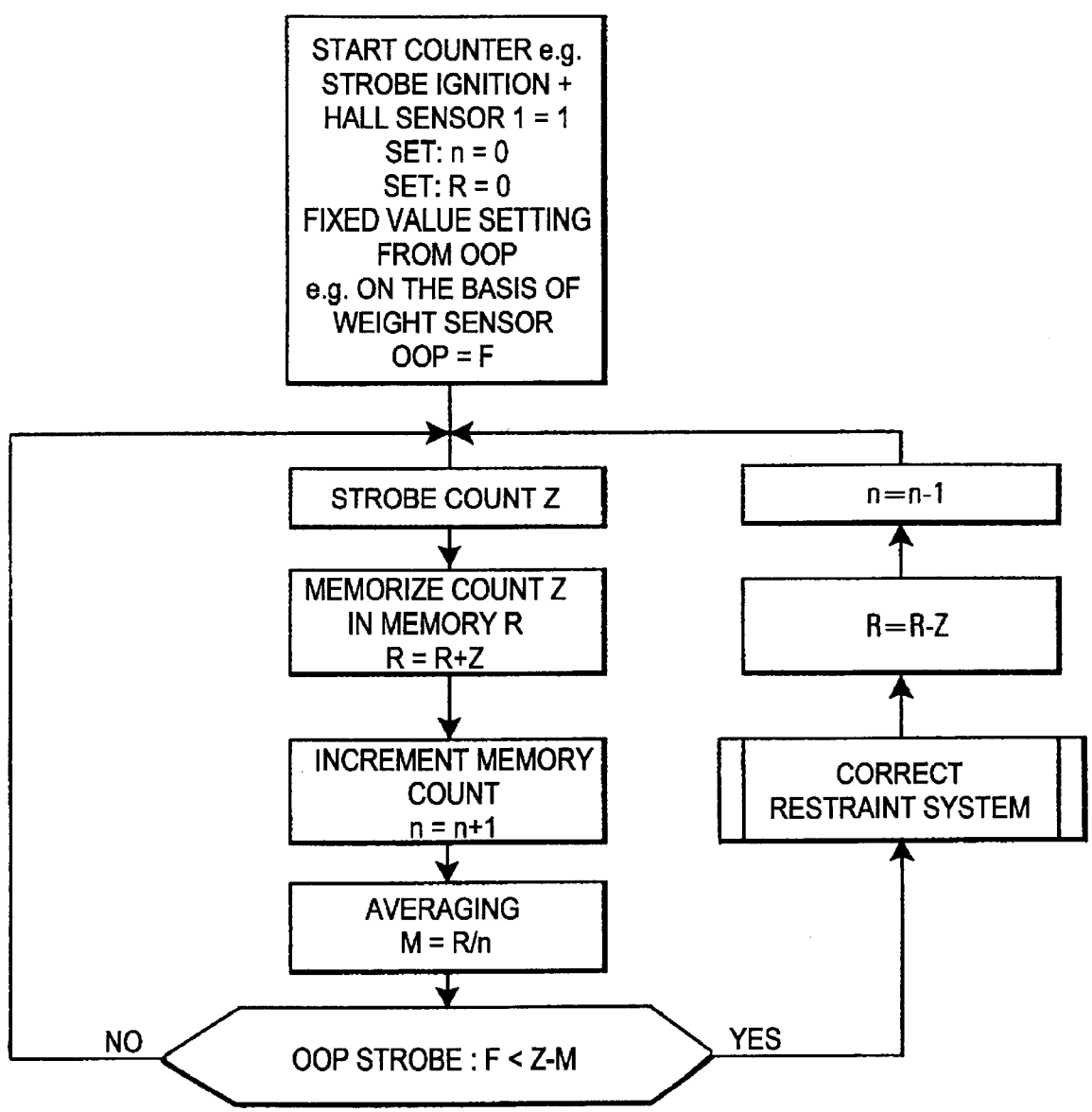
FIG. 3 is flow diagram illustrating one aspect of the method in accordance with the invention.

Referring now to FIG. 3 there is illustrated how the arrangement as shown in FIG. 2 may function.

When the vehicle is put into operation, more particularly started by activation of the ignition switch, the values R and n in the memory 34 are reset to zero. The presetting unit 42 defines a preset value F from the parameters furnished by the signal transducers 1, 2 and 3. Each strobe pulse from the timer 32 results in the updated count of the incremental counter 30 being determined. The value R incremented by the current count Z is then memorized in the memory 34 as the new value R; likewise memorized is the value n incremented by one. From the new values of R and n the mean value M is then computed. The difference computed in the subtractor 38 between the updated count T of the incremental counter 30 and the mean value M is then compared in the comparator 40 to the preset value F. If the preset value F is smaller than the difference between Z and M the system concludes that there is an out of position (OOP) condition, resulting in a correction of the function of at least one of the components A, B and C of the restraint system. After such a correction has been made, the value R is decremented by the updated count Z of the incremental counter 30; the value n being likewise decremented by one. This is followed by the next incremental counter 30 strobe in the same way as for a false result from the check in the comparator 40.

What is claimed is:

1. A belt retractor comprising:
    a frame;
    a belt reel rotatably mounted about an axis in said frame;
    a control disc coaxial with said belt reel; and
    a reduction gear unit for translating angles of rotation of said belt reel into reduced angles of rotation of said control disc;
        wherein an incremental counter is coupled to said belt reel, said incremental counter being incremented and decremented by, and according to, rotation of said belt reel, said counter being calibrated by a sensor associated with said control disc so that a count of said incremental counter is representative of the absolute angle of rotation of said belt reel.

2. The belt retractor as set forth in claim 1 wherein said incremental counter is triggered by an incremental detector formed by an incremental scale coupled to said belt reel for joint-rotation and a sensor fixed to said frame, said sensor being arranged opposite said incremental scale.

3. The belt retractor as set forth in claim 2 wherein said incremental detector is an optical detector.

4. The belt retractor as set forth in claim 2 wherein said incremental detector is a magnetic detector.

5. The belt retractor as set forth in claim 2 wherein said incremental detector outputs a signal to said incremental counter, said signal comprising an incremental signal and a signal indicative of the rotation of said belt reel.

6. The belt retractor as set forth in claim 1 wherein said sensor detects at least one recess of said control disc extending in a circumferential direction thereof.

7. The belt retractor as set forth in claim 1 wherein said belt reel has a total angular range of rotation that corresponds substantially to one complete revolution of said control disc.

8. A belt retractor as set forth in claim 1 further including at least one of the following components:
    an inflatable protective cushion,
    a belt tensioner; and a belt force limiter;
    wherein operation of at least one of said components is controlled as a function of said count of said incremental counter.

9. The belt retractor as set forth in claim 8 wherein at least one of said components is a plural-stage system with a plurality of possible stages of operation, an actual stage of operation from said possible stages being dictated by said count of said incremental counter.

10. The belt retractor as set forth in claims 8 or 9, wherein at least one of said components is selectively blocked from operation as a function of said count of said incremental counter.

11. The belt retractor as set forth in claim 8 wherein at least one of the following parameters is involved in controlling operation of said belt retractor: occupant weight, seating posture, position of a belt height adjuster, belt reel rotational velocity, belt reel rotational acceleration, and belt reel rotation.

12. Thy belt retractor as set forth in claim 8 wherein said count of said incremental counter is averaged over time to determine an average count value; and an out of position condition of the occupant (OOP) being detected when a difference between a current count value and said average count value exceeds a predetermined amount.

13. The belt retractor as set forth in claim 8 wherein a second derivative of a current count of said incremental counter is formed to generate a signal representative of angular acceleration of said belt reel.

* * * * *